United States Patent [19]

Hitt

[11] Patent Number: 4,814,044
[45] Date of Patent: Mar. 21, 1989

[54] SYSTEM FOR TREATING HEAVY HYDROCARBON-WATER MIXTURE

[76] Inventor: Franz A. Hitt, 1046 Meadowbrook, Corpus Christi, Tex. 78412

[21] Appl. No.: 96,066

[22] Filed: Sep. 14, 1987

Related U.S. Application Data

[63] Continuation-in-part of Ser. No. 751,944, Jul. 5, 1985, abandoned.

[51] Int. Cl.$^4$ .......................... B01D 3/00; C10G 7/04
[52] U.S. Cl. ......................................... 196/98; 196/46;
196/106; 196/110; 196/111; 196/125; 196/133;
137/202; 165/143; 165/174; 165/917; 202/173;
202/175; 202/176; 202/177; 202/14; 208/184;
208/187
[58] Field of Search ............... 202/176, 173, 177, 175,
202/182, 197, 267 R; 203/14, 22, 40, 86;
165/174, 154, 917, 111, 143; 208/187, 353, 365,
347; 196/46, 98–100, 106, 110, 133, 125, 136,
111; 137/202; 261/DIG.72

[56] References Cited

U.S. PATENT DOCUMENTS

| | | | |
|---|---|---|---|
| 1,257,209 | 2/1918 | Fletcher | 165/917 |
| 1,640,746 | 8/1927 | Braun | 165/143 |
| 2,099,493 | 11/1937 | Mahoney | 165/143 |
| 2,368,497 | 1/1945 | Shipley | 208/187 |
| 2,768,814 | 10/1956 | Frey et al. | 165/174 |
| 3,599,659 | 8/1971 | Nuter et al. | 137/202 |
| 3,791,965 | 2/1974 | Fitzsimons et al. | 208/184 |
| 3,921,711 | 11/1975 | Westbrock | 165/174 |
| 4,086,307 | 4/1978 | Glaspie | 261/DIG. 72 |
| 4,155,960 | 5/1979 | Gerdes et al. | 261/DIG. 72 |
| 4,219,070 | 8/1980 | Kurokawa et al. | 165/917 |
| 4,593,754 | 6/1986 | Holl | 165/174 |
| 4,670,103 | 6/1987 | Holl | 165/174 |

*Primary Examiner*—Wilbur Bascomb
*Attorney, Agent, or Firm*—G. Turner Moller

[57] ABSTRACT

In a technique for recovering hydrocarbon values from a heavy hydrocarbon-water mixture, the mixture is first delivered through a sub-assembly to remove solid particulates. Then the mixture is delivered through a series of heat exchanger—kettle arrangements in which the mixture is heated above the boiling point of water. Some of the steam formed is allowed to escape through steam removal devices in the heat exchanger. The inside of the heat exchanger includes a plurality of discrete baffles which are unconnected to the heat exchanger and which can be readily removed therefrom. Heating of the mixture continues in the kettles where the bulk of the water is boiled off the mixture. A heavy hydrocarbon oil is recovered in the liquid outlet from the last kettle. The vapors boiled off are recovered and condensed to recover a light hydrocarbon oil and quite pure water.

10 Claims, 4 Drawing Sheets

SYSTEM FOR TREATING HEAVY HYDROCARBON-WATER MIXTURE

This application is a continuation-in-part of application Ser. No. 06/751,944 filed July 5, 1985 now abandoned.

This invention relates to a method and apparatus for treating heavy hydrocarbon-water mixtures and more particularly to a technique for recovering hydrocarbon values therefrom.

There are a wide variety of situations where surprisingly large quantities of heavy hydrocarbons exist in emulsions or in mixtures with water. These water-hydrocarbon mixtures cannot be handled by conventional refineries because of the water content. Typical refineries are designed to handle hydrocarbons containing less than 0.1% BS&W, which is the industry term for basic sediments and water. In addition to large quantities of water, the water-hydrocarbon mixtures contemplated by this invention also contain high concentrations of particulate matter ranging in size from silt to beer cans.

The general plan of operation of this invention is to locate a sizeable quantity of a water-hydrocarbon mixture, assemble a treating facility near the source of water-hydrocarbon mixture, treat the water-hydrocarbon mixture to recover the hydrocarbon values and discharge a quantity of water and particulates.

There are numerous sources of the water-hydrocarbon mixture which are suitable for treatment by this invention. Perhaps the most spectacular are the settling or tailing ponds constituting the discharge from tar sand recovery operations in the Athabaska region in Alberta, Canada. These tailing ponds are one half mile wide, ten miles long and perhaps forty feed deep. The present refineries in this region discharge about 10,000 barrels of bitumen a day into these ponds. It would be desirable from both a commercial standpoint and an environmental standpoint to recover these hydrocarbon values.

There are large quantities of water-hydrocarbon mixtures present in areas scattered throughout the petroleum producing provences of the world. For example, near La Pryor, Tex., there are four pits of different size containing, in the aggregate, approximately 100,000 barrels of heavy hydrocarbons in a water-hydrocarbon mixture.

In petroleum producing areas of the United States, there are continually available a certain quantity of what are known as "tank bottoms". Tank bottoms comprise a mixture of solid particulates, water and hydrocarbons which accumulate in the bottom of storage tanks used to accumulate oil prior to trucking from a well.

Similar in composition are "ship bottoms". Ship bottoms are particulate, water and hydrocarbon mixtures which accumulate in the bottom of ships transporting crude oil.

All of these sources of potentially valuable hydrocarbons now comprise an eyesore, a management problem and a potentially troublesome environmental problem which would be desirable to eliminate.

The presently known technique for treating heavy hydrocarbon-water mixture is to add a diluent oil to the mixture, heat the mixture and then separate the hydrocarbons from the water, as by centrifuging. The basic problem of heavy hydrocarbon-water mixtures is that the hydrocarbons are relatively heavy and typically have a density comparable to that of water. Consequently, they cannot be separated by techniques which employ density differences. Diluent oil is added to the mixture and mixing is done to allow the diluent oil and the resident heavy hydrocarbons to dissolve thereby lowering the density of the hydrocarbon phase relative to the water phase. This allows separation of the hydrocarbons from the oil using techniques which rely on density differences.

One problem with using this technique is that the diluent oil is typically 40° gravity API oil which is, of course, prime refinery feed stock. It does not make a lot of sense to put 50 barrels of premium priced crude in a batch in an attempt to produce 100 barrels of relatively low priced, low quality crude.

Disclosures of some interest with respect to this invention are found in U.S. Pat. Nos. 1,640,746; 2,368,497; 3,888,760 and 4,334,605.

This invention has several aspects. Broadly, the water-hydrocarbon mixture comprising the feed stock is initially handled to remove the solid particulates. Next, the water-hydrocarbon mixture is delivered through a series of heat exchangers and kettle reboilers to heat the mixture to a temperature above the boiling point of the water component yet below the boiling point of the vast bulk of the hydrocarbon component. The bulk of the steam produced exits through the steam outlet of the kettle reboilers. Some steam, however, develops in the heat exchangers and is drawn off from the heat exchangers. After passage through several stages of heat exchangers and kettle reboilers, the mixture contains so little water that it can be handled by conventional refineries or burned as residual fuel oil.

It is accordingly an object of this invention to provide a technique for treating heavy hydrocarbon-water mixtures to recover the hydrocarbon values therefrom.

A great deal of the water produced as a by-product of this invention is condensed from steam and is accordingly quite free from dissolved solids and is potable. In areas where potable water is plentiful, the water by-product of this invention is at least easily disposed of. In areas where potable water is scarce, the water may be thought to be more of a blessing than the hydrocarbons recovered.

Another object of this invention is to provide a technique for treating heavy hydrocarbon-water mixtures in an efficient and expeditious manner.

Other objects and advantages of this invention will become more fully apparent as this description proceeds, reference being made to the accompanying drawings and appended claims.

IN THE DRAWINGS

FIGS. 1A and 1B, taken together, comprise a schematic diagram of the apparatus of this invention;

Figure 1A:
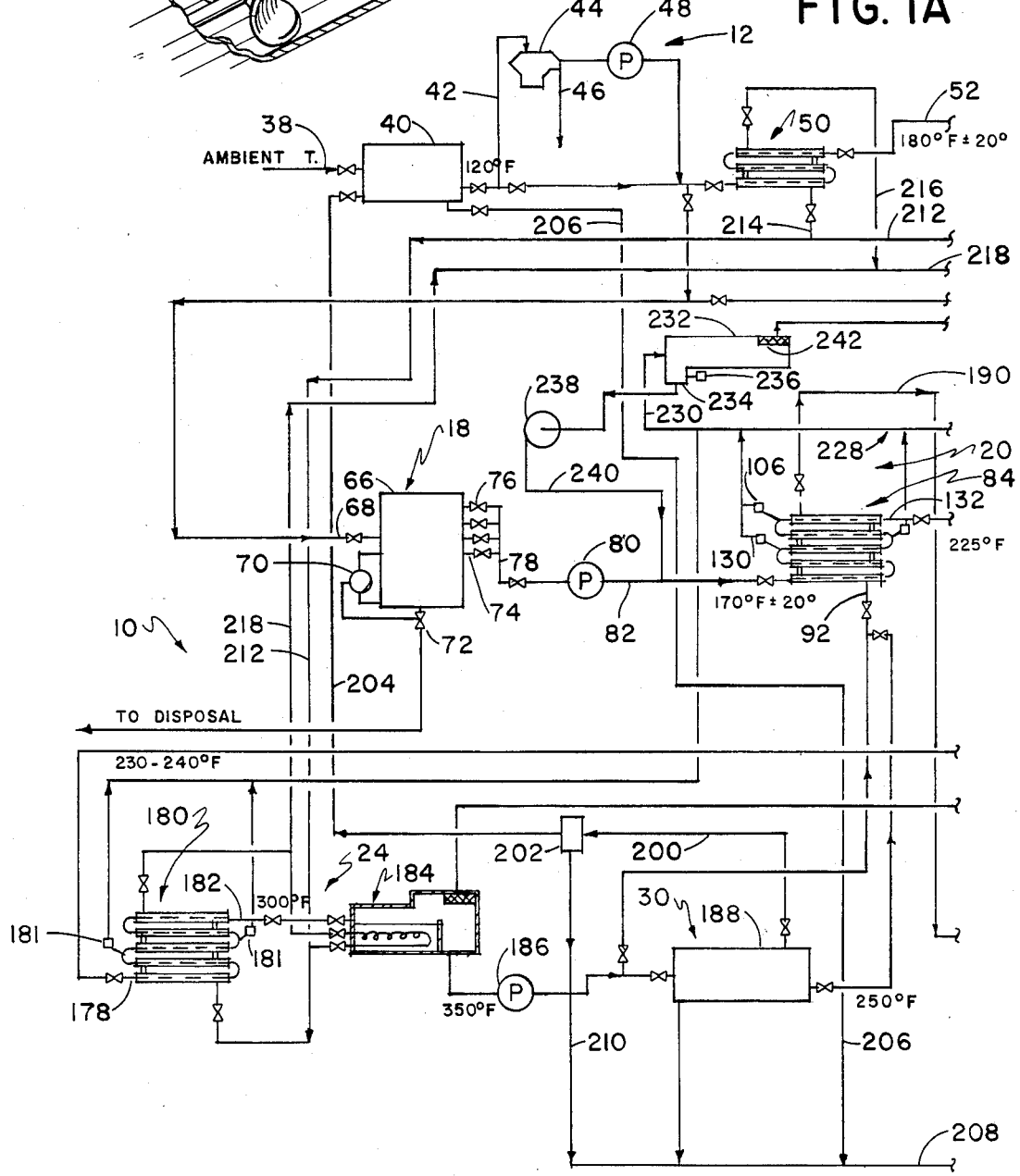
Figure 1B:
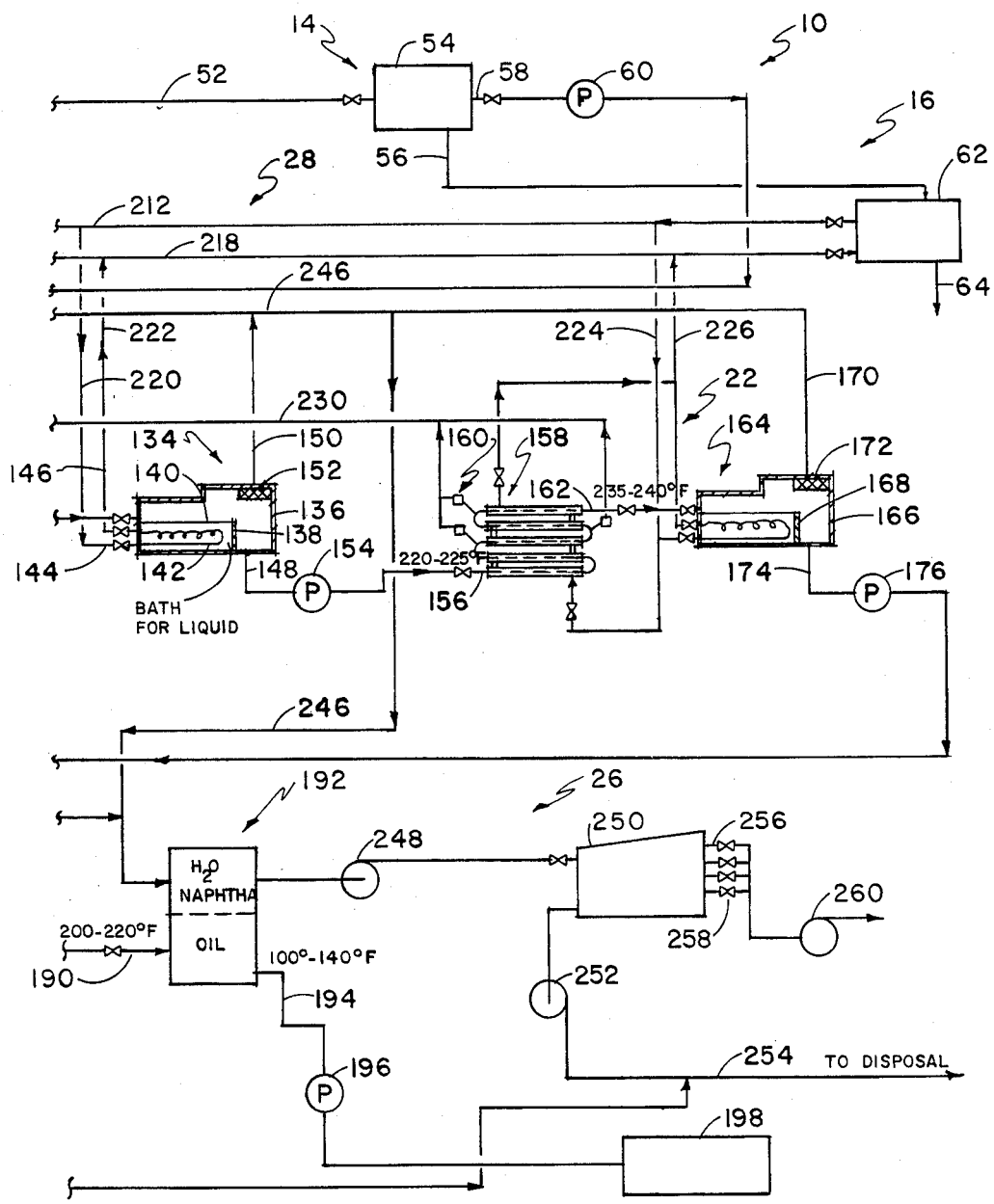

Referring to FIGS. 1A and 1B, there is illustrated a system 10 for recovering hydrocarbon values from a mixture of hydrocarbons, water and nonhydrocarbon solids. The system 10 comprises, as major components, means 12 for removing large solids, means 14 for removing small solids, means 16 for treating the removed solids, means 18 allowing water to settle out, a series of heat exchanger-kettle reboiler arrangements 20, 22, 24 for progressively reducing the quantity of water in the water-hydrocarbon mixture, a hydrocarbon recovery unit 26, a liquid heat recovery system 28 and a vapor heat recovery system 30.

The overall operation of the system 10 is to remove the solid particulates first, then allow any water to settle out that will settle out, then progressively boil water off the water-hydrocarbon mixture to produce a quantity of hydrocarbons that is sufficiently low in water content to allow the hydrocarbons to be refined by a conventional refinery or to be consumed as fuel oil and to recover heat from various units of the system and use that heat in the operation of other units.

The system inlet 38 connects to a first heat exchanger 40 receiving low grade steam or hot thermal conductive liquid from the heat recovery system 28 and heating the inlet mixture from ambient to about 120° F. for delivery through a conduit 42 into a large solids removal device 44. The device 44 is preferably a shale shaker of the type used in connection with oil well drilling rigs. A typical supplier of such shale shakers is Sweco. The solids rejected by the shale shaker 44 pass over the top of a screen and are discharged along a path 46. Typically, the solids separated by the shale shaker 44 are collected for disposal in a sanitary land fill.

Figure 4:
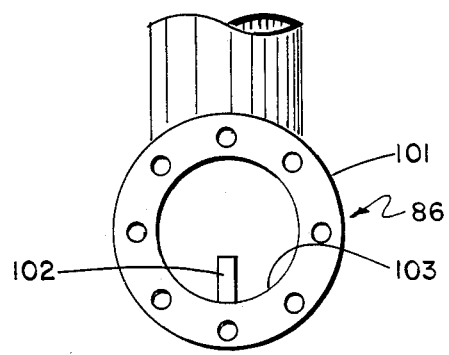
FIG. 4 is an enlarged cross-sectional view of FIG. 2, taken substantially along line 4—4 thereof as viewed in the direction indicated by the arrows.
Figure 5:
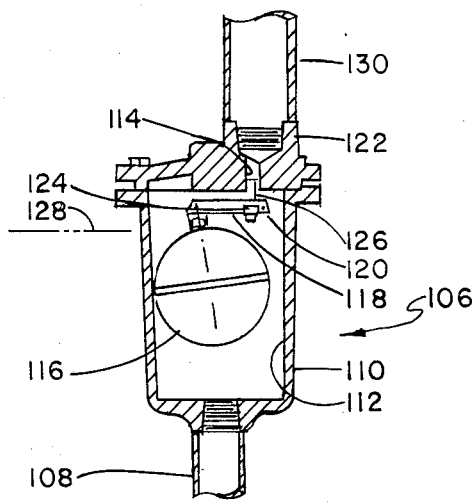
FIG. 5 is an enlarged cross-sectional view of a device to remove steam or other vapor phase material from the heat exchanger of FIG. 2.

The size of particulates separated by the shale shaker 44 is subject to considerable variation. Typically, the screen comprising part of the shale shaker 44 will pass particles smaller than about ¼" in diameter. The liquid discharge from the shale shaker 44 passes through a pump assembly 48 of a design shown in greater detail in FIG. 4. The mixture then passes into the inlet of a heat exchanger 50 where the temperature is somewhat less than the 120° F. temperature of the outlet end of the heat exchanger 40. The outlet temperature of the heat exchanger 50 is 180° F.±20° F. The outlet of the heat exchanger 50 is connected to a conduit 52 in communication with one or more centrifuges 54. The density difference between the solid particulates in the mixture and the heated liquid components is sufficient to allow satisfactory separation of the solid particulates and removal thereof through an outlet condhit 56 which connects to the solid treating means 16. The liquid outlet 58 of the centrifuges 54 connects to a pump assembly 60 which delivers the mixture to the water settling station 18.

The solids removing means 12, 14 of this invention each including a heater 40, 50 upstream of the solids removal unit 44, 54 a variety of reasons. First, by heating the mixture, the density difference between the solid and liquid phases is increased because the solids normally associated with hydrocarbon-water mixtures do not change density to the extent that the liquids do. Thus, the centrifuge 54 works much more efficiently. Second, a significant quantity of hydrocarbons associated with typical water-hydrocarbon mixtures are solid, or nearly so. Without heating the mixture, a significant proportion of the hydrocarbon material would be discarded by the shale shaker 44. In addition, liquifying the hydrocarbons in the mixture allows them to run off solids rather than tending to adhere thereto.

The solids treating means 16 may be of any desired type. Preferably, the solids treating means 16 comprises a burner 62 in which hydrocarbon soaked solids are fired, along with a supplementary fuel, to produce heat utilized by the vapor heat recovery system 30 for a variety of the units of the system 10. Calcined particulates are discharged from the burner 62 through an outlet conduit 64.

The water settling station 18 comprises a large tank 66 having an inlet conduit 68 connected to the pump assembly 60. The material delivered from the pump assembly 60 may be an emulsion of hydrocarbons and water, a mixture of water and a hydrocarbon-water emulsion or a simple water-hydrocarbon mixture. The tank 66 has a capacity of about 10–30% of the volumetric input of the system 10 thereby providing a residence time in excess of two hours A liquid level gauge or controller 70 is provided to open a valve 72 to discharge water to a disposal system (not shown).

Vertically spaced along the upper end of the tank 66 are a plurality of overflow outputs 74, each having a valve 76 therein, connected to a common outlet conduit 78 in communication with a pump assembly 80. The overflow outlets 74 are vertically spaced to allow removal of different quality liquid from the upper end of the tank 66 depending on the condition of the liquid therein. For example, it may be that the liquid in the tank 66 is an emulsion. Because of the heat added to the mixture by the heaters 40, 50 is often sufficient to break an emulsion, any emulsion delivered from the pump assembly 60 will often be in the process of breaking. In this circumstance, the uppermost conduit 74 will deliver the cleanest hydrocarbon material which is the easiest and most desirable to treat downstream settling station 18. In this circumstance, the uppermost valve 76 will be opened.

On the other hand, if there is no emulsion in the tank 66 or if the emulsion is not breaking, the lowermost valve 76 may be opened since the provision of additional residence time in the tank 66 may be useless. Those skilled in the art will realize that the intermediate overflow conduits 74 will also be desirable under some conditions inside the tank 66.

Figure 2:
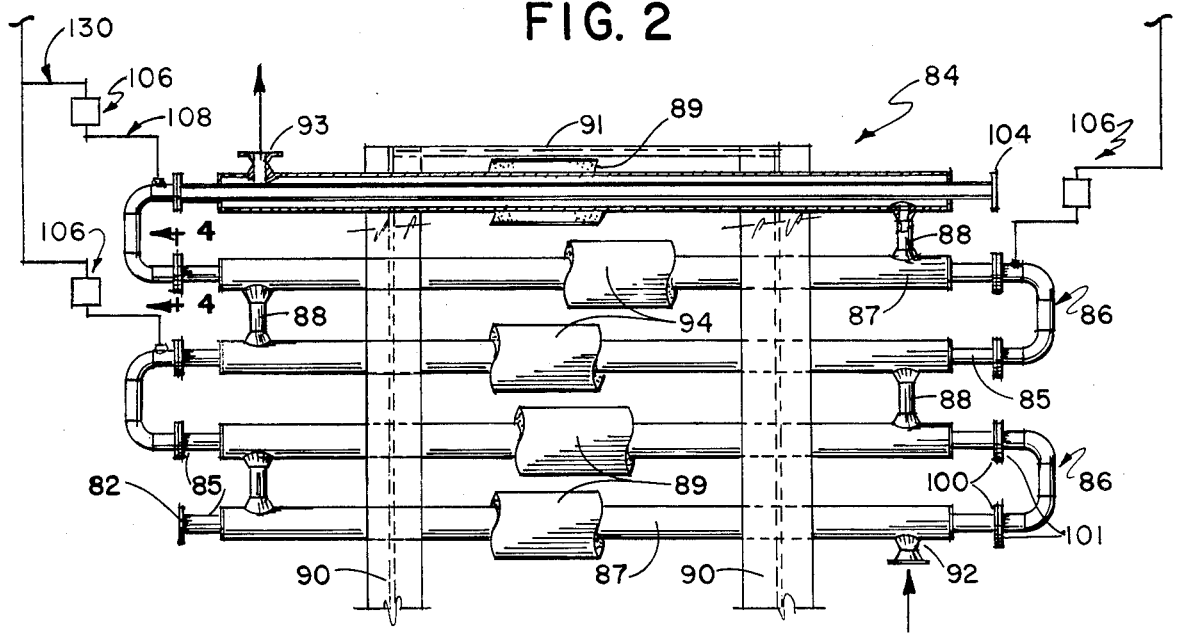
FIG. 2 is an enlarged side elevational view, partly in section, of one of the heat exchangers used in the system of FIGS. 1A and 1B.

The outlet of the pump assembly 80 is connected to an inlet 82 of a heat exchanger 84 of the first exchanger-reboiler arrangement 20. At the inlet 82, the mixture is preferably not much worse than about half water - half hydrocarbons and is at a temperature of about 170° F.±20° F. As shown in FIG. 2, the heat exchanger 84 comprises a series of straight tubular sections 85 disposed in a vertical plane and interconnected by a series of bends 86. Surrounding at least a portion of the straight sections 85 are a series of sleeves 87 interconnected by risers 88 at alternating ends thereof. If desired, suitable insulating material 89 may be wrapped about the tubes 85, bends 86 and sleeves 87 to minimize heat loss from the exterior thereof. As shown in FIG. 2, the heat exchanger 84 comprises five straight sections 85 interconnected by four bends 86 supported by a pair of horizontally spaced column structures 90 interconnected by a horizontal beam 91. The inlet 92 for the heat exchanging fluid, which is hot oil or steam, is positioned adjacent the downstream end of the first straight section 85. It will be seen that the risers 88 and the outlet 93 of the heat exchanging fluid are arranged so that the heat exchange in each straight section 85 is countercurrent, by which is meant that the hot heat exchange material enters into heat exchange relation with the hot end of each of the straight sections 85. It will be noted, however, that the inlet 92 of the heat exchanging medium is much closer to the mixture inlet 82 than to the outlet 94. Thus, when viewing the heat exchanger 84 as a whole, the heat exchange relation is more nearly concurrent than countercurrent. There is a good reason for this. If the heat exchanging relation in the exchanger 84 were purely countercurrent, there would be a tendency to produce a large quantity of steam in the last or upper straight tubular section 85. This is to be avoided in the treatment of hydrocarbon-water mixtures for several reasons. When steam begins to form in the heat exchanger 84, there is a pressure increase inside the exchanger 84 which retards or delays the entry of liquid material into the inlet 82. Thus, a purely countercurrent heat exchanger tends to vapor lock in the process of this invention and is less efficient than a concurrent or mainly concurrent heat exchanger.

It has been learned that simply passing the hydrocarbon-water mixture through the inside of the heat exchanger 84 and passing a hot oil on the outside of the straight tubular sections 85 does not efficiently heat the hydrocarbon-water mixture. It was originally thought that a simple scheme to create more turbulence inside the straight tubular sections 85 would suffice. Accordingly, a double helix, made of steel, was inserted in the straight tubular sections 85 to create more tubulence. Although some improvement was noted, it was thought that the efficiency was far too low.

Figure 3:
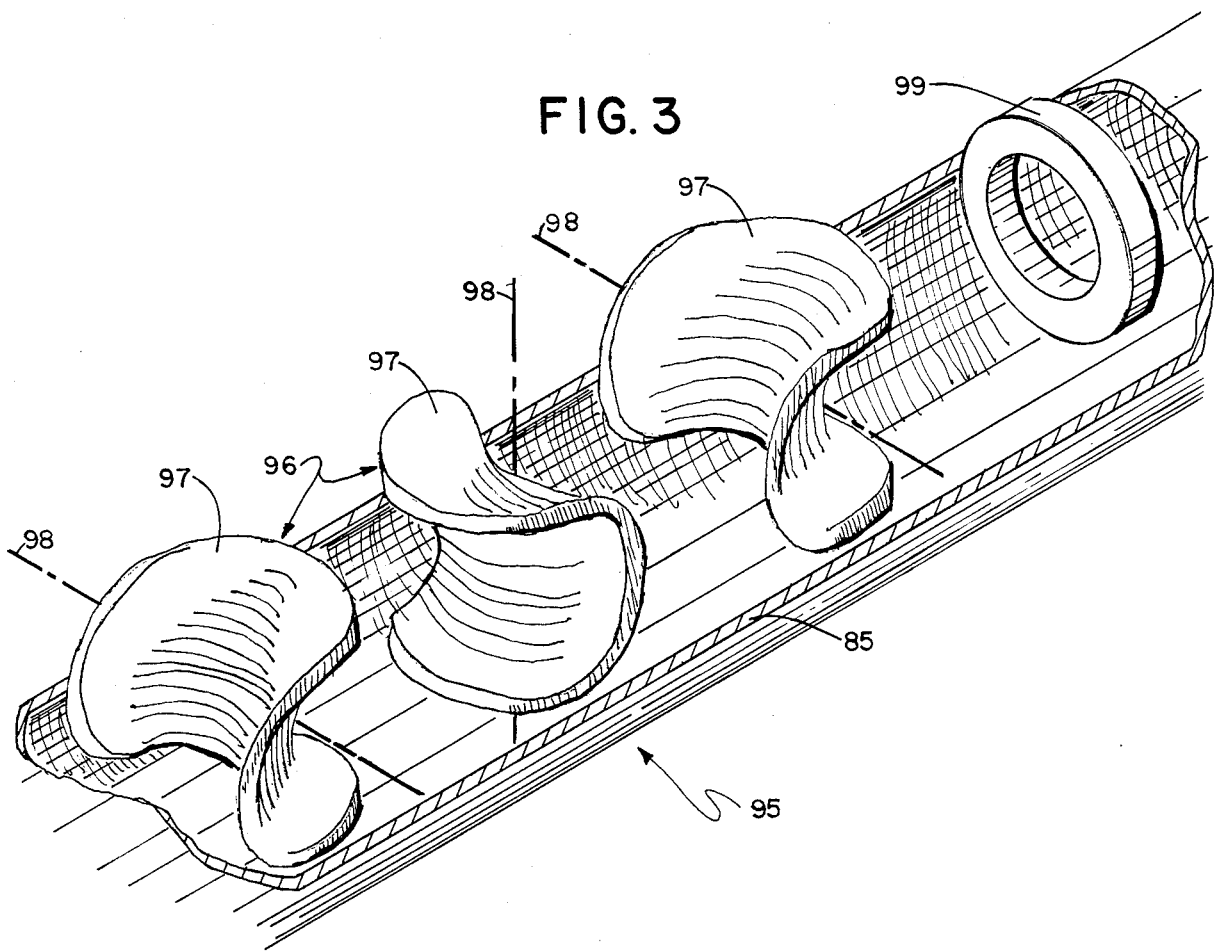
FIG. 3 is an enlarged exploded isometric view of inserts within the heat exchanger of FIG. 2.

As shown in FIG. 3, an assemblage 95 of baffles 96 are placed inside the straight tubular sections 85 of the heat exchanger 84. The baffles 96 are ceramic saddles typically used in refinery towers where products condense on the saddles. The baffles 96 provide outwardly diverging surfaces 97 which deflect the hydrocarbon-water mixture toward the inside of the straight tubular section 85 and accordingly increase turbulence significantly as well as direct the mixture into the hot inside surface of the sections 85.

The baffles 96 are placed inside the tube 85 in a non-nesting manner so that there is no tendency of the baffles to pile up and accumulate at the downstream end of each tubular section 85 in an order that would tend to block flow therethrough. In the case of the saddles illustrated in FIG. 3, the axes 98 are rotated 90° from one baffle 96 to the next.

In order to further prevent nesting of the baffles 96, a spacer 99 is included at regular intervals through the assemblage 95. The spacer 99 is of totally different shape than the baffles 96 and is not nestable therewith at any relative orientation of the baffles 96 and spacer 99. Conveniently, the spacer 99 is of cylindrical shape. The arrangement of three saddles 96 followed by a cylindrical spacer 99 is effective to prevent jumbling or undesirable nesting of the baffles 96 in a manner that would seriously impede flow through the heat exchanger 84.

Another feature of the baffles 96 and spacer 99 is that they are of clay or ceramic material. The baffles 96 and spacer 99 are in contact with the inside wall of the tubular sections 85 and are thus capable of absorbing heat therefrom. Although the baffles 96 and spacer 99 do not efficiently absorb heat from the tubular section 85, they do become hot and are effective to transmit heat to the water-hydrocarbon mixture flowing therearound.

To further prevent undesirable nesting of the baffles 96, the baffles 96 are preferably of considerable size relative to the internal diameter of the tubular sections 85. On the other hand, it is desirable that the baffles 96 provide as small a resistance to flow through the tubular sections 85 as is consistent with the desired increase and heat transfer and increase in tubulance. To these ends, the maximum dimension of the baffles 96 relative to the tubular sections 85 is on the order of about ½-¾ and is preferably about ⅝ thereof. The spacer 99 should be sufficiently large to prevent the baffles 96 from passing between the spacer 99 and the interior of the tubular sections 85. Conveniently, the spacer 99 is of about the same diameter as the maximum dimension of the saddles 96.

The assemblage 95 is surprisingly effective to increase heat transfer to the water-hydrocarbon mixture passing through the tubular sections 85. As shown in Table I, the outlet temperature of the water-hydrocarbon mixture increased significantly by the use of the ceramic saddle arrangement shown in FIG. 3 over a steel double helix inside the tubular sections 85.

TABLE I

|  | steel double helix | ceramic saddles |
|---|---|---|
| mixture inlet temperature | 100–120° F. | 100–120° F. |
| maximum hot oil temperature | 500° F. | 550° F. |
| Mixture outlet temperature | 160° F. | 240° F. |

This increase in the outlet temperature of the mixture is particularly surprising since including the assemblies 95 inside the tubular sections 85 reduces the residence time of the hydrocarbon-water mixture passing through the heat exchanger 84.

Figure 8:
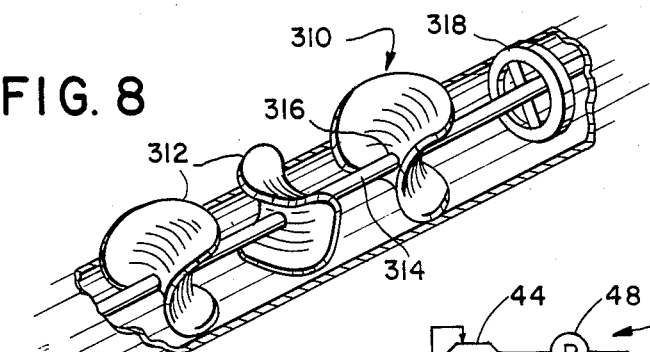
FIG. 8 is an isometric view of another embodiment of baffles or inserts within the heat exchanger.

Referring to FIG. 8, a preferred assemblage 310 of baffles 312 are placed inside the straight tubular sections of the heat exchangers 84. The baffles 312 comprise steel saddles fixed to a central rod 314, as by weldments 316 or the like, at locations where the saddles 312 do not abut. Although no longer so important, the assemblage 310 may comprise spacers 318 secured to the rod 314 at positions spaced from the saddles 312. Although the ceramic saddles 96 work very well from a heat exchange view point, there is a tendency of the baffles 96 and spacer 99 to crush or crumble. Thus, when one opens the heat exchanger 84 to clean out the tubular sections 85, it is very difficult to do. By making the baffles 312 of steel and securing them to the rod 314, removing the baffles 312 from the heat exchanger 84 is much easier because the entire baffle arrangement 310 may be removed in one piece merely by pulling on the rod 314.

The following examples illustrate the effectiveness of the baffles 96, 312. Four hundred feet of heat exchanger without the baffles 96, 312 were used to heat a 100° F. incoming mixture of heavy hydrocarbons and water. With a 350° F. heat exchanging liquid, the outlet fluid temperature was 110° F., or a rise of 10° F. With a 450° F. heat exchanging liquid, the outlet fluid temperature was 115° F., or a rise of 15° F. With a set of baffles 96, 312 in a sixty foot length of heat exchanger, an incoming 100° F. mixture of heavy hydrocarbons and water was heated to boiling at the outlet by 350° F. heat exchanging liquid. In the field under cold conditions where the heavy hydrocarbon-water mixture contained some ice, the mixture was heated to boiling in the sixty foot heat exchanger by 350° F. heat exchanging liquid.

It occasionally happens that the heat exchanger 84 gets plugged up thereby requiring that it be disassembled and the straight tubular sections 85 be cleaned out. It will be evident that the straight tubular sections 85 are connected to the bends 86 by flange connections 100, 101 thereby allowing the bends 86 to be removed from the heat exchanger 84 so that a long rod can be pushed through the tubular sections 85. This will dislodge the baffles 96, spacers 99 and whatever else is causing the flow blockage. In order to prevent the baffles 96 and spacers 99 from moving into the bends 86 because of fluid flow through the heat exchanger 84, an obstruction 102 is welded in the flange 101 of the bend 86 adjacent the flange opening 103 as shown best in FIG. 4. It will be seen that when the flange 101 is uncoupled from its mating flange 100, the obstruction 102 is removed thereby allowing the saddles 96 and spacers 99 to be pushed out of the straight tubular sections 85.

Because of the partially concurrent and partially countercurrent arrangement of the heat exchanger 84, it will be seen that the heat exchanger 84 is operated in such a way as to minimize steam formation therein. Because of the temperatures involved, however, steam is inevitably formed inside the exchanger 84. In order to minimize vapor lock or the reduction of through-put through the exchanger 84, means 106 are provided for removing steam from the heat exchanger 84 intermediate the ends thereof. As shown best in FIGS. 2 and 3, the steam removal means 106 include an inlet conduit 108. It has been learned that steam tends to travel on the outer diameter of the bends 86, as opposed to the inner diameter thereof. Accordingly, in order to efficiently remove steam from intermediate the ends of the heat exchanger 84, the inlet conduit 108 opens into the bends 86 on the outer diameter thereof.

The steam removal means 106 each include a container 110 having a chamber 112 therein providing an outlet 114 adjacent the upper end of the chamber 112 while the inlet conduit 108 opens into the lower end of the chamber 112. Inside the chamber 112 is a float 116 pivotally connected to a valve operating the lever 118. The valve operating lever 118 is pivotally connected, as by a pin 120, to an upper end 122 of the compartment 110 The lever 118 carries a valve element 124 which acts to close a valve seat 126 when the valve operating lever 118 is in its uppermost position. The density of the float 116 is selected so that it floats in the water-hydrocarbon mixture and falls when the chamber 112 fills with steam. Thus, the valve 124 closes when the chamber 112 fills above a level 128. When the liquid level in the chamber 112 falls inside the container 110, the valve 124 opens and allows steam to excape through an outlet conduit 130. It will accordingly be seen that the steam removal means 106 acts to discharge steam from the heat exchanger 84 intermediate the ends thereof.

It will be noted that each of the bends 86, except for the first or most upstream bend, is equipped with one of the steam removal means 106. It has been found that little or no steam is retrieved from the first bend 86 presumably because the temperature of the mixture has not yet risen to a level to produce significant quantities of steam.

At the heat exchanger outlet 104, the temperature of the mixture is at least on the order of about 225° F. and is under sufficient pressure to avoid wholesale boiling of water in the water-hydrocarbon mixture. The heat exchanger outlet 104 is connected by a conduit 132 to the product inlet of a kettle 134. The kettle 134 comprises part of the arrangement 20 and includes a relatively elongate, low vessel 136 having a weir 138 therein establishing a liquid mixture level 140 on the inlet end of the kettle 134. A heat exchange coil 142 is disposed in the inlet kettle end and connected to the vapor heat recovery system 30 by suitable conduits 144, 146. The kettle includes a liquid outlet 148 opening into the vessel 136 downstream of the weir 138 and a vapor outlet 150 having a demister 152 therein.

As the mixture enters the product inlet, the liquid falls into the compartment created by the weir 138. Because the kettle 134 in only partially filled, any water having a tendency to vaporize at the temperature of the kettle 134 is free to do so. Any such vapor passes through the demister 152 and out of the vapor outlet conduit 150.

The liquid held in the kettle 134 by the weir 138 is heated by hot oil or steam in the coil 142 to boil off such water as may boil off before the liquid runs over the weir 138 into the liquid outlet 148. The liquid outlet 148 is connected to a pump assembly 154 delivering the partially dewatered hydrocarbon-water mixture to an inlet 156 of a heat exchanger 158 of the arrangement 22. At the inlet 156, the mixture is approximately 25% water and 75% hydrocarbons having a temperature in the range of 220°-225° F. It might be thought that boiling off a substantial quantity of the water in the kettle 134 would lower the temperature of the mixture substantially. It will be realized, of course, that heat is added to the kettle 134 through the coil 142 so that the temperature of the mixture remains relatively high.

The heat exchanger 158 is preferably substantially identical to the heat exchanger 84 including a plurality of steam removal devices 160 to prevent the formation of excessive steam inside the heat exchanger 158. The outlet of the heat exchanger 158 is connected to a conduit 162 where the temperature of the mixture is in the range of 235°-240° F. The conduit 162 connects to the product inlet of a kettle 164 comprising part of the arrangement 22. The kettle 164 is preferably substantially identical to the kettle 134 including a vessel 166 having a weir 168 therein, a vapor outlet 170 above a demister 172 and a liquid outlet 174 connected to a pump assembly 176. The liquid mixture in the liquid outlet 174 is on the order of about 90% liquid hydrocarbon and 10% water having a temperature in the range of 230°-240° F.

The pump assembly 176 delivers the liquid mixture to an inlet 178 of a heat exchanger 180 comprising part of the arrangement 24. The heat exchanger 180 is preferably substantially identical to the heat exchangers 84, 158 and includes a plurality of steam removers 181 and a mixture outlet connected to a conduit to a conduit 182 where the mixture temperature is in the neighborhood of 300° F. The conduit 182 connects to the product inlet of a kettle 184 which is preferably substantially identical to the kettles 134, 164. The output of the kettle 184 is approximately 350° F. and is 99 plus percent hydrocarbons. The output is delivered to a pump arrangement 186. Part of the output of the pump 186 is delivered to a main heat exchanger 188 comprising part of the vapor heat recovery system 30 as will be more fully explained hereinafter. Part of the output of the pump arrangement 186 is delivered directly to the hot oil inlet 92 of the heat exchanger 84 as the heat conducting liquid. The amount of oil delivered through the heat exchanger 188 is regulated to produce just enough steam to satisfy the requirements of the inlet heat exchanger 40. The liquid hydrocarbon output of the heat exchanger 188 is commingled with the heat exchanger 84. The liquid hydrocarbons exiting from the outlet 102 of the heat exchanger 84 is delivered by suitable piping 190 to a fin fan 192. The fin fan 192 comprises an air-liquid heat exchanger reducing the temperature of the liquid hydrocarbons to a value in the range of 100°-140° F. so that liquid hydrocarbons can be handled in a more conventional manner. The oil output 194 of the fin fan 192 is connected to a pump arrangement 196 delivering the heavy liquid hydrocarbons to a storage facility 198.

The heat exchanger 188 comprises part of the vapor heat recovery system 30. Steam is generated in the heat exchanger 188 and delivered by piping 200 to a steam stripper 202 so that only vapor phase material is delivered through the piping 204 to the first heat exchanger 40. The steam output of the first heat exchanger 40 is connected by piping 206 to a main water manifold 208. Similarly, the liquid outlet of the steam stripper 202 is connected by piping 210 to the manifold 208.

The liquid heat recovery system 28 comprises the heater 62 through which is circulated a thermally conductive liquid such as a heavy hydrocarbon. Piping 212 exits from the hot side of the heater 62 and provides a heat source for a variety of the heat using components of the system 10. Suitable branch conduits 214, 216 act to route part of the hot oil through the pre-heater 50 and deliver it to piping 218 comprising a return line to the heater 62. Similarly, branch conduits 220, 222 connect the coil 142 of the kettle 134 into the liquid heat recovery system 28. Similarly, branch conduits 224, 226 connect the heat exchanger 158 and the kettle 164 to the piping 212, 218. As shown best in FIG. 1A, the piping 212, 218 terminate at the heat exchanger 180 and the kettle 184 to provide heat thereto.

The hydrocarbon recovery unit 26 includes a system 228 for collecting vapor phase material from the heat exchanger-kettle arrangements 20, 22, 24 comprising piping 230 connected to the steam removal means of the heat exchangers 84, 158, 180. The piping 230 is connected to the inlet end of a receiver or separator 232 having a liquid compartment 234 in the bottom thereof from which liquid is periodically dumped by a liquid level controller 236 into the inlet end of a pump arrangement 238 having an output 240 connected to the inlet end of the heat exchanger 84. It will be appreciated that the steam removal means 106 are apt to periodically allow small quantities of heavy hydrocarbons, easily condensible hydrocarbons or water to enter the piping 230. This material is best handled by reinjecting it into the liquid stream of the system 10.

The separator 232 includes a demister 242 connected by piping 246 to the conduits 150, 170 as well as the demister of the kettle 184. The piping 246 connects to the inlet end of a water-naptha section of the fin fan 192. The fin fan 192 cools the vapor material passing through the system 228 to a temperature sufficient to condense water and light hydrocarbons. The outlet temperature of the water-naptha section of the fin fan 192 is in the neighborhood of 80°-120° F. Accordingly, liquid exiting from the water-naptha section of the fin fan 192 enters a pump arrangement 248 and is delivered into a storage tank 250. There is considerable density difference between water and naptha so that water settles out readily in the tank 250. Water is drawn off from the bottom of the tank 250 in any suitable manner, as by the use of a liquid lever controller (not shown) activating a pump arrangement 252 to deliver the water to a disposal line 254 connected to the water manifold 208. Since the water delivered through the water line 254 is mainly condensed steam, it will be evident that this water is quite free of dissolved solids and, with some aeration to allow evaporation of light hydrocarbons, will be potable or nearly so.

In order to remove light hydrocarbons from the storage tank 250, a series of vertically spaced overflow conduits 256 is provided with control valves 258 so that a designed hydrocarbon level of the tank 250 can be tapped to deliver a light liquid hydrocarbon to sales.

Figure 6:
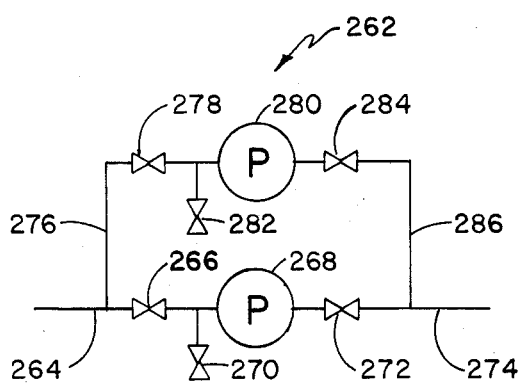
FIG. 6 is a schematic view of one type of pump assembly used in the system of FIGS. 1A and 1B.

Referring to FIG. 6, there is illustrated a pump arrangement 262 typical of the pump arrangements 12, 60, 80, 154, 176, 186, 196. The pump arrangement 262 includes an inlet conduit 264 connected to a valve 266 connected to the inlet of a pump 268. A bleed-off needle valve 270 is connected between the valve 266 and the pump 268 in order to bleed off liquid from the pump 268 during removal of the pump 268 for repairs. An outlet valve 272 connects output conduit 274. In order to provide a second or alternate pump in the event the pump 268 fails, a branch conduit 276 connects to the inlet 264 upstream of the valve 266 and connects to a valve 278 connected to the inlet of the pump 280. A bleed-off needle valve 282 is provided between the valve 278 and the pump 280. The outlet of the pump 280 connects to a valve 284 in communication with a conduit 286 connected to the outlet conduit 274 downstream of the outlet valve 272.

Figure 7:
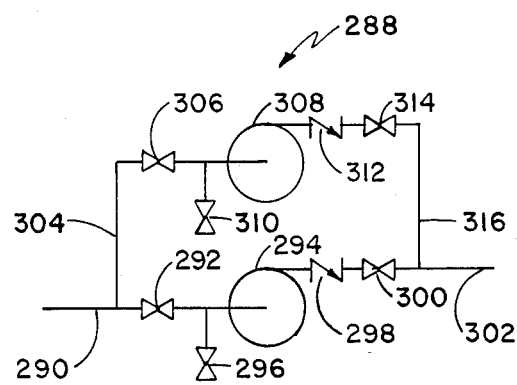
FIG. 7 is a schematic view of another type of pump assembly used in the system of FIG. 1A and 1B.

Referring to FIG. 7, there is illustrated a pump arrangement typical of the pump arrangements 238, 248, 252. The pump arrangement 288 includes an inlet 290 connected to a valve 292 in communication with a central inlet of a pump 294. A bleed-off check valve 296 is disposed between the valve 292 and the pump 294. The outlet of the pump 294 connects through a check valve 298 and a control valve 300 to an outlet conduit 302.

In order to provide an alternate pump for the pump 294, a branch conduit 304 connects to the inlet 290 upstream of the valve 292 and includes therein a control valve 306. The control valve 306 connects to the central inlet of a pump 308. A bleed-off control valve 310 is disposed between the valve 306 and the inlet of the pump 308. The outlet of the pump 308 connects through a check valve 312 and a control valve 314 to a branch conduit 316 connected to the outlet 302.

The throughput capacity of the system 10 depends, in large measure, on the water-hydrocarbon ratio exiting from the tank 66 through the selected overflow outlet 74. Table II shows this relationship in one particular design.

| II. | |
|---|---|
| Water-hydrocarbon Ratio | Hydrocarbon Capacity |
| 50% water - 50% oil | 2000 barrels/day |
| 30% water - 70% oil | 2800 barrels/day |
| 20% water - 80% oil | 3500 barrels/day |

The exact water-hydrocarbon ratio leaving the tank 66 is a function many things, some of which can, be controlled and many of which cannot. The initial water content at the inlet 38 is, of course, of considerable importance. The density of the hydrocarbons in the mixture and the presence of any emulsion in the miture are also uncontrollable factors. The success in breaking any emulsion by heating in the heat exchangers 40, 50 and allowing the mixture to settle in the tank 66 also affects the hydrocarbon-water mixture in the overflow conduit 74.

It is assumed, for purposes of illustration, that the hydrocarbon-water mixture in the overflow conduit 74 is 50-50. The temperature at the inlet of the heat exchanger 74 is on the order of about 170±20 F. Considerable heating occurs in the heat exchanger 84 so that the outlet temperature is above the boiling point of water or on the order of about 225° F. Some water, in the form of steam, exits from the heat exchanger 84 through the steam removal devices 106. Consequently, the water-hydrocarbon ratio is somewhat altered before it enters the first kettle 134. A great deal of the water in the mixture is boiled off in the kettle 134. The kettle 134, as well as the kettles 164, 180, are of substantial capacity. Kettles are often used in refineries to heat feed stock. The kettles 134, 164, 184 would be viewed as nominal 20,000 barrel/day capacity in a conventional refinery. Thus, the kettles of this invention are oversized by a factor of about 10. Leaving the kettle 164, the mixture is about 25% oil and is at a temperature above the boiling point of water, e.g. above 220° F. It will be appreciated, of course, that some volatile hydrocarbons have been boiled off and have escaped the mixture through the vapor outlet 150 of the kettle 134.

During passage through the heat exchanger 158, the temperature of the mixture is raised slightly to a value on the order of about 235°-240° F. and some water has been removed in the form of steam through the steam removal devices 160. As mentioned previously, it is desirable to remove steam from the heat exchangers 84, 158, 180 to avoid vapor lock and to get rid of the water without further handling. The water-hydrocarbon ratio entering the kettle 164 is changed somewhat from the 25-75 ratio.

A good bit of the remaining water in the mixture boils off in the kettle 164. Typically, the mixture entering the heat exchanger 180 is at a temperature on the order of about 230°-240° F. while the ratio is about 10% water, 90% oil. Again, some water from the mixture comes off in the heat exchanger 180 through the steam removal devices 181. The temperature of the mixture entering the kettle 184 is at least on the order of about 300° F. The bulk of the water remaining in the mixture boils off in the kettle 184. The liquids leaving the kettle 184 are at a temperature on the order of about 350° F. but less than about 500° F. and the mixture is about 99% oil, 1% water. This mixture constitues the product of the system 10 and may be used either as feed stock for a conventional refinery or as residual fuel oil. Because the water in the mixture has been boiled off, any salt in the water downstream of the settling tank 66 will eventually end up in the liquid hydrocarbons at the storage tank 198. Consequently, it may be necessary to run the hydrocarbons through a desalter to remove such dissolved solids.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. A system for treating a liquid hydrocarbon-water mixture for recovering hydrocarbons therefrom, comprising a heat exchanger having
    a first conduit defining a tortuous mixture flow path having a multiplicity of alternating straight sections and bends and including an interior wall, an inlet for the liquid mixture, an outlet and a multiplicity of baffles intermediate the inlet and outlet for periodically diverting the mixture toward the interior wall;
    a second conduit, of larger size than the first conduit and surrounding at least part of some of the first conduit straight sections in heat transferring relation therewith, for transporting a heat exchange material and heating the mixture in the first conduit to a temperature above the steam formation point of the water in the mixture and below the boiling point of the bulk of the hydrocarbons of the mixture; and
means in communication with the first conduit between the inlet and the outlet for removing gaseous phase material from the first conduit and leaving liquid material in the first conduit at a series of locations spaced along the first conduit, the gaseous phase material removing means comprises a chamber in communication with the first conduit for receiving gaseous and liquid phase material therefrom having a valve in the upper end thereof, a float in the chamber and a valve operator connecting the float and the valve for closing the valve when the chamber is full of liquid and for opening the valve when the liquid level in the chamber falls;
means in communication with the first conduit outlet for receiving the mixture and for reducing the water content thereof; and
means in communication with the last mentioned means for recovering the hydrocarbons in the mixture.

2. The system of claim 1 wherein the gaseous phase material comprises gaseous hydrocarbons therein and wherein the means for recovering hydrocarbons comprises means in communication with the gaseous phase removal means for condensing hydrocarbons from the gaseous phase material.

3. The system of claim 1 wherein the chamber is in communication with the first conduit through a portion thereof not surrounded by the second conduit.

4. The system of claim 3 wherein the bend comprises a conduit section having an outwardly concave side and an outwardly convex side, the chamber being in communication with the first conduit through the outwardly convex side.

5. The system of claim 3 wherein the series of locations comprise a series of bends.

6. The system of claim 5 wherein the series of locations comprise each bend downstream from the inlet except for a first one.

7. The system of claim 1 wherein the baffles ceramic articles.

8. The system of claim 7 wherein the baffles comprise non-nestable articles.

9. The system of claim 1 wherein the baffles comprise a rod extending parallel to the flow axis, the baffles being connected to the rod.

10. The system of claim 1 wherein the baffles comprise saddles.

* * * * *